June 28, 1966   B. D. MATTHEWS   3,258,273
UNITARY ASSEMBLY FOR CONVERTING A BICYCLE TO A TRICYCLE
Filed Jan. 28, 1964   2 Sheets-Sheet 1
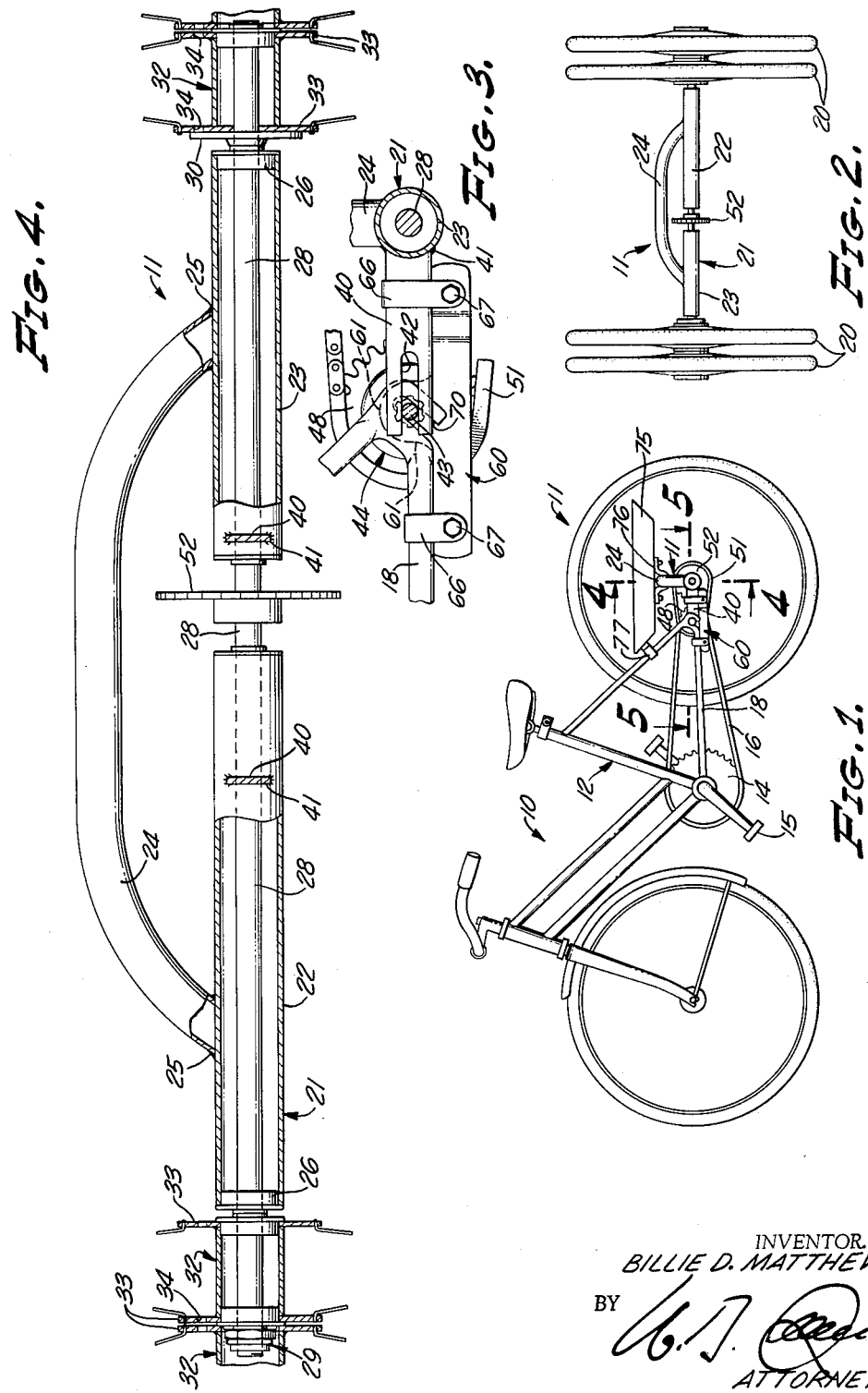
INVENTOR.
BILLIE D. MATTHEWS
BY
ATTORNEY June 28, 1966          B. D. MATTHEWS          3,258,273
UNITARY ASSEMBLY FOR CONVERTING A BICYCLE TO A TRICYCLE
Filed Jan. 28, 1964          2 Sheets-Sheet 2

INVENTOR.
BILLIE D. MATTHEWS
BY
ATTORNEY

United States Patent Office 3,258,273
Patented June 28, 1966

3,258,273
UNITARY ASSEMBLY FOR CONVERTING A BICYCLE TO A TRICYCLE
Billie D. Matthews, 673 Ackley St., Monterey Park, Calif.
Filed Jan. 28, 1964, Ser. No. 340,717
18 Claims. (Cl. 280—7.15)

This invention relates to bicycles and more particularly to a simple, rugged assembly adapted to be readily substituted for the rear wheel of a bicycle to convert the same to a tricycle.

There is an ever-increasing interest among certain groups of adults, including, in particular, vacationers and older people in tricycles, whereby a sense of greater security and freedom to observe are available when riding a self-propelled vehicle. Unfortunately suitable tricycles for adults are not available at reasonable prices.

By resort to this invention, it has been found that a highly satisfactory and versatile tricycle can be quickly and inexpensively provided by substituting a simple specially constructed converter carriage assembly for the rear wheel of a conventional bicycle. An assembly of this type, as provided by the present invention, embodies many unique features and is quickly and easily installed on a bicycle frame by a novice. For example one preferred embodiment of the converter unit comprises a wheeled carriage having one freely rotating wheel and one driven wheel having a chain drive connection with a combination brake and speed change transmission unit. The latter unit, along with the converter assembly, can be substituted for the rear wheel of a bicycle and clamped in place using a simple rigid clamping means securable to the bicycle frame without need for alterations of the latter in any respect. The input to the combination power transmission and brake unit comprises a sprocket wheel aligned with the main drive sprocket of the bicycle and cooperating therewith in supporting the main drive chain. The rider is thereby provided with a tricycle operating in the same manner as a bicycle and capable of being propelled at either of two speeds at the rider's option including the positive braking of the carriage wheels.

No changes or modifications of any kind are required in the bicycle and the substitute assembly may be installed with the aid of simple tools readily available in any household.

Other features include readily detachable carriage wheels of the ordinary bicycle type permitting the assembly to be compactly boxed for shipment either through the mails or otherwise. All reinforcing brackets are confined to the zone of the carriage axle housing without need for other struts or braces connected to the upper rear end of the bicycle frame. This leaves the zone overlying the converter assembly free for cargo carrying purposes. This capability is substantially increased by adding an auxiliary pair of carriage wheels to the converter unit. When this extra pair of wheels is not needed they are quickly detached and stored until again needed.

Accordingly it is a primary object of the present invention to provide a new and improved tricycle designed more particularly for use by adults and incorporating numerous novel features.

Another object of the invention is the provision of a carriage assembly readily substitutable for the rear wheel of a bicycle thereby to convert the latter to a tricycle.

Another object of the invention is the provision of a carriage converter assembly adapted to be attached to the rear fork of a bicycle frame and including as a component a manually operable brake and change speed power transmission device.

Another object of the invention is the provision of a converter carriage assembly having a tubular main frame rotatably supporting a unitary carriage axle provided with forwardly projecting bracket means rotatably supporting carriage brake means thereon.

Another object of the invention is the provision of a converter carriage assembly having a tubular main frame rotatably supporting a unitary carriage axle provided with forwardly projecting bracket means rotatably supporting a change speed power transmission readily shiftable from position to position at the rider's option.

These and other more specific objects will appear upon reading the following specification and claims and upon considering in connection therewith the attached drawing to which they relate.

Referring now to the drawing in which a preferred embodiment of the invention is illustrated.

FIGURE 1 is a side elevational view of a preferred embodiment of the invention in fully assembled condition but with the near rear wheel removed for purposes of clarity;

FIGURE 2 is a transverse elevational view of the converter assembly per se as viewed from the rear end of FIGURE 1;

FIGURE 3 is a fragmentary elevational view on a reduced scale as viewed along line 3—3 on FIGURE 5;

FIGURE 4 is a fragmentary view on an enlarged scale of the carriage housing and axle assembly taken along line 4—4 on FIGURE 1 with parts broken away to show details of the construction;

Figure 5:
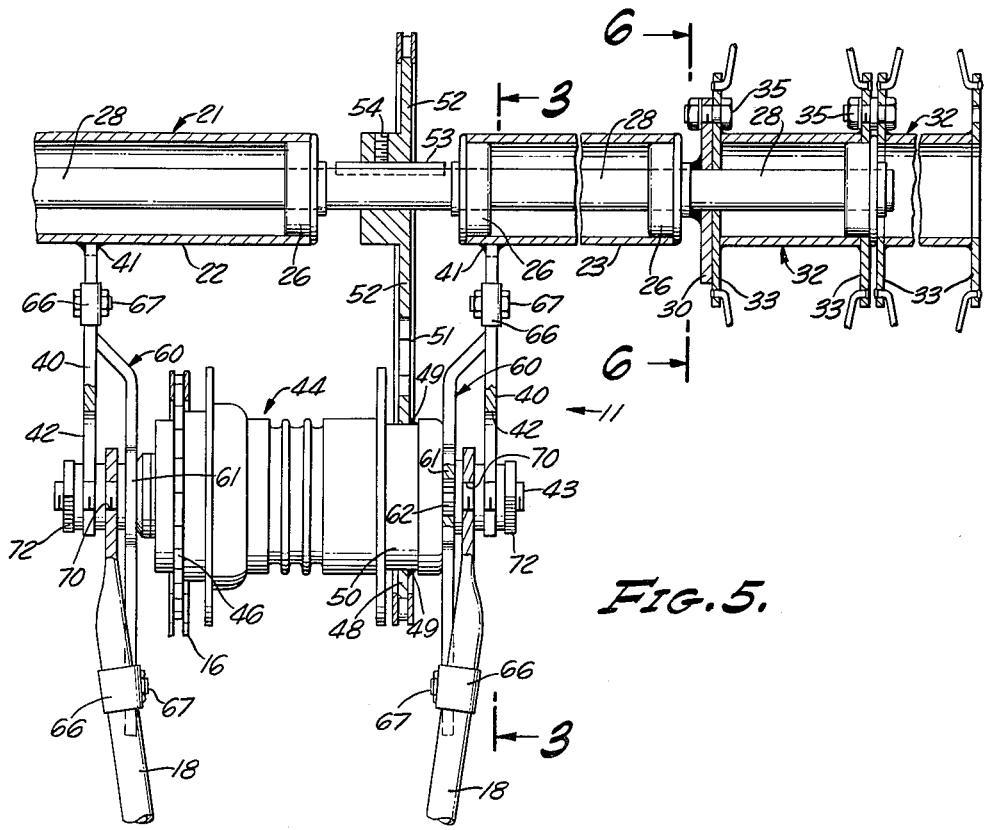
FIGURE 5 is a fragmentary horizontal sectional view on an enlarged scale taken generally along line 5—5 on FIGURE 1.
Figure 6:
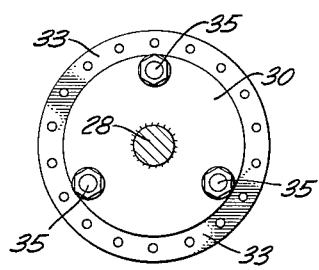
FIGURE 6 is a fragmentary sectional view taken along line 6—6 on FIGURE 5.

Referring initially to FIGURE 1 there is shown a complete tricycle assembly designated generally 10 incorporating the converter carriage unit 11 of this invention as a substitute for the rear wheel of a conventional bicycle frame 12. It will be understood that any suitable bicycle frame may be employed having the usual main drive sprocket 14 rigidly connected to pedals 15 and having a main drive chain 16. Frame 12 includes the usual pair of rear wheel mounting side forks 18, 18 (FIGURES 1, 5) between which the rear wheel of the bicycle is normally located. However when using the present invention it will be understood this rear wheel and its hub unit is first removed.

As herein shown, converter unit 11 is equipped with dual sets of bicycle wheels at the outboard ends of a main axle journalled in a tubular main frame and axle housing 21. This main housing comprises a pair of tubular axle sections 22, 23 of slightly different lengths rigidly interconnected by a bow-shaped brace tube 24 preferably lying in a vertical plane and having its opposite ends welded as indicated at 25 to housings 22, 23.

Journalled in the aligned axle housings 22, 23 on suitable anti-friction bearings 26 is a one-piece axle 28. One end is threaded and seats a lock nut assembly 29 (FIGURE 4). The other end of axle 28 is provided with a disc 30 welded, brazed or otherwise secured to axle 28 exteriorly of the right hand end of housing section 23 as clearly appears in FIGURE 4. Disc 30 is located sufficiently inwardly of the right hand end of axle 28 to seat a spool type bicycle hub 32. Both of the radial flanges 33, 33 of hub 32 as well as disc 30 are provided with a plurality of aligned holes 34 to seat a corresponding number of fasteners such as bolts 35. Those bolts passing through disc 30 serve to lock the single or dual wheels on the right hand end of axle 28 rigidly to the axle for rotation along therewith. Similar bolts 35 passing through the outer flange 33 of this wheel are equally effective in holding a second wheel positively to the inner wheel and in axial alignment with axle 28. A suitable spacer washer normally encircles bolt 35 between the adjacent flanges of a given set of wheels 20, 20.

Referring to the left hand end of the axle as shown in FIGURE 4, it is pointed out that lock nut 29 holds the inner one of that set of wheels loosely journalled on the left hand end of axle 28. The outer wheel hub fits over lock nut 29 and is held rigidly coaxially of the carriage by the three bolts 35 in the same manner described above in connection with the right hand set of wheels. Accordingly the left hand wheel or set of wheels will be understood as rotating freely on that end of the axle thereby providing desirable differential rolling action as the vehicle negotiates curves along the path of travel.

Main frame 21 of the converter includes a pair of parallel brackets 40, 40 rigidly welded at 41 to tubes 22, 23 and projecting horizontally forward thereof as is best shown in FIGURES 1 and 5. The forward ends of these brackets have open ended slots 42 to receive the threaded ends of stationary shaft 43 forming an important part of a combination brake and change speed power transmission unit designated generally 44. While various brake and change speed units can be used, the one here shown is readily available in the market place, such as shown in U.S. Patent to Gleasman 2,910,157. Since its construction details are well known to persons skilled in this art, they need not be described herein except generally and to convey a better understanding of the mode of operation.

The input end of power transmission 44 includes an input sprocket 46 aligned with main drive sprocket 14 and supporting main drive chain 16 of bicycle 10. This sprocket is effective to transmit power through internal change speed components to an output sprocket 48 spot brazed at 49 to output hub or sleeve 50 of transmission 44. Sprocket 48 in turn, is connected by a short endless chain belt 51 with a driven sprocket 52 fixed to axle 28 by a key 53 and a set screw 54 (FIGURE 5). It will be understood that driven sprocket 52 is shiftable axially of key 53 over a considerable range and as necessary to align this sprocket with output sprocket 48. Once sprocket 52 is in adjusted position set screw 54 may be tightened to lock the sprocket against displacement along the axle.

It will be understood that when input sprocket 46 is driven forwardly it is effective to drive the output sprocket in the same direction to propel the right hand set of carriage wheels 20, 20 forwardly. The particular speed at which these wheels are driven depends on the speed adjustment then prevailing in power transmission unit 44. This selection is controlled by the rider while seated on the tricycle seat and through the appropriate reverse movement of pedals 15 through a short arc to which the speed change mechanism interiorly of unit 44 is responsive. During each such reverse movement the mechanism functions to change to a different speed including back to low speed.

It will also be understood that this same change-speed mechanism includes a positive brake likewise responsive to distinctive reverse movement of pedals 15 to set a brake directly connected to output sprocket 48 thereby locking both the sprocket and axle 28 against rotation. The reverse movements employed to set the brake and change the speed of the mechanism 44 are distinctive to the end that either may be operated selectively and when desired by the rider.

To provide positive rugged anchorage of carriage frame 21 to bicycle frame 12 with a minimum of obstruction and bracing, there is provided by this invention a pair of elongated strong supplemental brackets 60, 60 along either side of the rear fork 18, 18. Each of these brackets may be viewed as of inverted T-shape the stem 61 of which comprises a rounded upwardly extended hub (FIGURE 3) having an opening fitting over the outer ends of the shaft 43 extending axially through transmission unit 44. The opening through boss 61 on the output end of transmission unit 44 is noncircular as is indicated in dotted lines in FIGURE 3 and is engaged over a complementally shaped boss 62 on the end of output hub 50 in order that this one of brackets 60 can act as a substitute for the usual brake anchor arm of unit 44. The opposite or rear ends of brackets 60 are offset away from one another as clearly shown in FIGURE 5 and are preferably so designed and shaped that their rear ends underlie the associated one of carriage brackets 40, 40 and their forward ends underlie the horizontal arms of rear wheel fork 18. Clips 66 encircle brackets 40 and fork arms 18 respectively and are securely fastened by bolts 67 to the associated ends of bracket 60.

The assembly of the described carriage converter assembly 11 will be readily apparent from the foregoing description of the components. Since wheel anchor disc 30 is welded inwardly of one end of axle 28, the axle can be assembled or disassembled only from one end of tubular main frame 21 provided lock nut 29 is first removed. Either single or dual bicycle wheels of conventional construction except for the openings 34 in their flanged hubs are attachable to the axle after it has been assembled within main frame 21. The axle proper terminates at the outer ends of the inner set of wheel hubs as is obviously desirable when only one pair of carriage wheels is employed.

As made and shipped, the converter carriage assembly 21 includes the change speed transmission unit 44 and the supplemental brackets 60, 60, together with chain belt 51. This unit is easily substituted for the rear wheel of a bicycle by detaching the latter and then lowering the downwardly and forwardly inclined slots 70 in the rear fork 18 of bicycle frame 12 over the threaded ends of the stationary power transmission unit shaft 43. The open ended slots 42 of horizontal brackets 40 are inserted over this shaft while chain belt 51 is demounted following which the two drive chains 16 and 51 are assembled over their respective mating sprockets. During this operation anchor clips 66 are detached. After proper adjustments have been made in the various components as permitted by slots 42 and 70 to maintain each of the belts in the proper operating tension, clamping nuts 72 are tightened along the outer ends of shaft 43 to clamp the parts tightly together and to the rear fork of the bicycle. Clips 66 are then assembled to the opposite ends of the supplemental brackets 60 to provide additional rigid bracing positively locking the rear carriage unit against rotation in either direction about shaft 43.

There remains to be noted that carriage frame 21 provides an excellent support for a platform, tray or other rigid support 75 on which light cargo of a wide assortment may be carried. This tray may be suitably anchored to bow-shaped member 24, as by clips 76 and its forward end may be further braced and supported by clips 77 embracing the upwardly inclined member of rear wheel fork 18.

While the particular unitary assembly for converting a bicycle to a tricycle herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A converter unit adapted for use in converting a conventional bicycle to a tricycle, said unit comprising rigid axle housing means having axle means supported for rotation therewithin and having first and second ends projecting from the opposite ends of said axle housing, means for securing first wheel means in a freely rotating nondriving manner to said first axle end, means for securing second wheel means rigidly to said second axle end for rotation along with said axle means, said axle housing means including rigid bracket means projecting forwardly from the mid-length portion thereof, power transmission and braking means supported by said rigid bracket means with the axis thereof forwardly of and parallel to said rigid axle and having a plurality of sprocket means thereon, driven sprocket means secured to said axle means intermediate the opposite ends thereof and including driving belt means adapted to be connected to one of said sprocket means on said power transmission and braking means, and means carried by and forming part of said converter unit for attaching the same to the rear end of a bicycle frame in lieu of the rear wheel and its hub assembly.

2. A converter unit as described in claim 1 characterized in that the securing means for said second wheel includes means for detachably connecting the same to the hub of outboard wheel means mounted coaxially of said second axle end.

3. A converter unit as defined in claim 1 characterized in that said second wheel securing means includes radial flange means fixed to said second projecting axle end closely adjacent the axle housing and having means for detachably connecting a wheel hub thereto.

4. A converter unit as defined in claim 1 characterized in that said first axle end is threaded and provided with detachable nut means for holding a wheel hub detachably assembled to said first axle end and free for rotation in either direction relative to said axle means, and said axle means being removable endwise from said axle housing by releasing said driven sprocket means from its fixed connection to the axle means and withdrawing said threaded end of the axle means through the axle housing.

5. A converter unit as defined in claim 1 characterized in that said driven sprocket means is mounted generally midway between the opposite ends of said housing, and releasable means for securing said sprocket means selectively in different positions axially of said axle means.

6. A carriage unit adapted to be rigidly connected crosswise of the rear end of a bicycle frame to provide a tricycle, said carriage unit having a rigid unitary axle housing, axle means journalled in said housing with its outboard ends projecting from either outer end thereof and supported respectively by separate wheel means at least one of which is fixed to the associated axle end on which the wheel means is mounted, a driven sprocket rotatable with said last mentioned wheel means, variable speed transmission means having its output end connected by power transmitting means to said driven sprocket and including means for supporting said transmission means from axle housing, said power transmitting means including sprocket means secured coaxially of the output end of said variable speed transmission means and having a chain belt connection with said driven sprocket.

7. A carriage unit adapted to be rigidly assembled to the rear end of a bicycle frame in lieu of the usual rear wheel to provide a tricycle, said carriage unit having a rigid unitary axle housing, axle means journalled in said housing and having outer ends projecting outwardly beyond the opposite ends of said housing, wheel means mounted on each axle end one of which is rotatable relative to the other and fixed to the associated end of said axle means so as to rotate therewith, means rigidly supporting a speed change transmission means in closely spaced parallel relation to the midportion of said axle housing, chain and sprocket power transmitting means connecting the output of said transmission means to said axle means to drive said one wheel, and means for rigidly connecting said axle housing and said speed change transmission means to the rear end of a bicycle frame.

8. A unitary carriage assembly for use in converting a bicycle to a tricycle and adapted to be substituted for the rear wheel of a conventional bicycle, said carriage assembly having a rigid tubular frame rotatably supporting axle means having outboard ends projecting outwardly therebeyond, first wheel means fixed to one of said axle ends, second wheel means on the other of said axle ends and free to rotate independently of said first wheel means, variable speed power transmission means operable in response to rider-applied manipulation to change its output speed relative to its input speed and having axle means positioned parallel to and forwardly of said carriage axle, bracket means rigidly connected to the forward side of said tubular frame for supporting said power transmission means, chain and sprocket means extending between the power output of said transmission means and said axle and said first wheel means, and means for detachably connecting said carriage assembly to the rear end of a bicycle frame.

9. A unitary carriage assembly as defined in claim 8 characterized in the provision of means rigidly but adjustably securing said carriage assembly to a bicycle frame and including provision for varying the spacing between the axes of said power transmission means and said carriage axle means.

10. A unitary carriage assembly as defined in claim 8 characterized in that said last named means includes a pair of elongated rigid brackets extending forwardly and rearwardly of either axial end of said power transmission means, and means securing the rear ends of said bracket means to said tubular carriage frame and the forward ends thereof to a bicycle frame in a manner holding said carriage assembly rigidly and nonrotatably in place across the rear end of a bicycle frame.

11. A unitary carriage assembly as defined in claim 10 characterized in that the midportion of said elongated bracket means encircles axle means projecting from the opposite ends of said power transmission means and cooperates therewith and with the bicycle frame to hold said carriage assembly immovably assembled to the bicycle frame.

12. A carriage assembly for use in lieu of the rear wheel of a bicycle thereby to convert the bicycle to a tricycle, said assembly comprising a two-wheel carriage having axle means nonrotatably connected to said wheels at one end only of said axle, a rigid housing for said axle means including forwardly projecting rigid bracket means opposite its midportion, an axle-supported brake assembly mounted crosswise of said bracket means with its axis parallel to said carriage axle means, chain sprockets on the input and output sides of said brake assembly one of which sprockets is adapted to be connected to the main drive sprocket of a bicycle and the other sprocket of which is connected by chain belt means to a driven sprocket fixed to said carriage axle means, said brake assembly being operable when rotated in one direction to propel said carriage forwardly and when rotated through a short path in the reverse direction to set said brake assembly and said output sprocket, and shaft means projecting trunnion-fashion from the opposite sides of said brake assembly provided with means for use in securing said carriage assembly immovably to the rear end of a bicycle frame with said brake input sprocket in planar alignment with the main drive sprocket of the bicycle.

13. A converter carriage assembly adapted for use in converting a bicycle to a tricycle, said assembly comprising a wheeled carriage having a rigid frame having a pair of rigid brackets projecting forwardly from its midportion with their forward ends spaced to lie closely beside the sides of the rear wheel fork of a bicycle frame, shaft means having threaded ends supported crosswise of the forward ends of said brackets, pedal-operated brake means supported on said shaft between the ends thereof, an input chain sprocket at one end of said brake assembly adapted to be driven in one direction by the main drive sprocket and chain to transmit propelling power and adapted to set said brake assembly when driven through a short path in the opposite direction, an output chain sprocket on the opposite side of said brake assembly having a chain drive connection with said wheeled carriage and operable to drive the same forwardly from the bicycle main drive sprocket, and means for detachably securing the threaded ends of said shaft means and the forwardly projecting bracket means rigidly to the rear wheel fork of a bicycle frame and including a rigid and stationary anchor for said brake assembly.

14. A converter carriage assembly adapted to be substituted for the rear wheel of a bicycle to convert the latter to a tricycle, said assembly having a single axle, means for detachably securing carriage wheels fixedly to one end and rotatably to the other end of said axle, a driven chain sprocket secured to the midregion of said axle, tubular housing means enclosing portions of said axle to either side of said chain sprocket and including bow-shaped rigid tubular brace means lying in a vertical plane and having its opposite end portions rigidly fixed to juxtaposed portions of said tubular housing means and cooperating therewith to form a rigid frame for said carriage assembly, a pair of generally parallel brackets projecting forwardly from said rigid frame to either side of said chain sprocket and extending forwardly in a generally horizontal plane at right angles to the plane of said bow-shaped tubular brace, power transmission means rotatably supported between said parallel brackets and parallel to said single axle, said power transmission means having a plurality of chain sprocket means mounted thereon with one thereof lying in the same plane as the sprocket secured to said axle and the other of said sprockets being adapted to be connected by a chain to the pedal sprocket of a bicycle, and drive chain means interconnecting the sprocket on said axle and one of the sprockets on said power transmission means, and said axle being removable from said tubular main frame by withdrawal through one outer end thereof.

15. A converter carriage assembly as defined in claim 14 characterized in that said carriage wheels include radially flanged hubs formed with holes distributed thereabout for use in detachably bolting similarly constructed wheel hubs rigidly thereto to provide said carriage with two pairs of supporting wheels along either side thereof.

16. A converter carriage assembly as defined in claim 14 characterized in that said carriage wheels include a pair of wheels on either end of said axle, said wheels each having spool-shaped hubs including radially flanged ends, each of said flanged ends having a plurality of holes therethrough, fastener means rigidly interconnecting the adjacent flanges of each pair of wheels to hold the same coaxially joined together with the outermost wheels lying beyond the ends of said axle, threaded means on one axle end detachably holding one joined pair of wheels thereon and free to rotate about the axis of said axle, disc means lying normal to and fixed to the axle inwardly of its other end, and fastener means for holding the second joined pair of wheels secured to said disc means for rotation along with said axle.

17. In combination, a carriage unit adapted to be substituted for the rear wheel of a bicycle to convert the bicycle to a tricycle, said carriage unit having axle housing means supporting rotary axle means and a pair of wheels at the outer ends thereof, means on said axle housing supporting a fixed shaft parallel to said axle means and offset laterally from the midportion of said axle means, change speed mechanism mounted on said shaft having a power input member and a power output member, a sprocket fixed to said power input member, a sprocket fixed to said power output member, a third sprocket fixed to said axle means in planar alignment with and larger in diameter than the sprocket on said output member, chain belt means interconnecting said last mentioned sprockets, and said sprocket on said input member being adapted to be coupled by chain means with a main pedal-operated drive sprocket unit centrally of a tricycle main frame.

18. In combination, a power transmission assembly for use in operating a tricycle, said assembly comprising a shaft adapted to have the ends thereof rigidly and immovably anchored to a tricycle frame rearward of the propelling pedals and main drive sprocket assembly of a tricycle, change-speed and braking mechanism mounted on said shaft between the ends thereof and including a rotary input housing member and an independently rotatable output housing member, and separate driven sprockets rigidly secured to each of said housing members one of which is adapted to be mounted by a drive chain to said main drive sprocket and the other of which sprockets is adapted to be connected by a drive chain effective to drive the rear carriage of a tricycle, a pair of rigid elongated bracket members each having their midportions seated over the opposite ends of said immovable shaft, means on one end of said brackets for use in rigidly anchoring the forward ends of said bracket to the main frame of a tricycle, and means on the other end of each of said brackets for use in anchoring the rear ends of said brackets to rigid frame means for the tricycle carriage thereby to anchor the latter rigidly to a tricycle main frame and against rotation about the axis of said immovable shaft.

References Cited by the Examiner

UNITED STATES PATENTS

| 636,570 | 11/1899 | Shugers | 280—7.1 |
| 1,167,286 | 1/1916 | Foley | 280—7.1 |
| 1,434,701 | 11/1922 | Hudry | 280—261 X |
| 1,559,276 | 10/1925 | Nelson | 280—261 |
| 2,323,261 | 6/1943 | Vigo | 280—261 X |
| 2,759,373 | 8/1956 | Orchard | 74—750 |
| 2,910,157 | 10/1959 | Gleasman | 74—750 X |

FOREIGN PATENTS

| 569,608 | 1/1924 | France. |
| 28,108 | of 1910 | Great Britain. |

BENJAMIN HERSH, *Primary Examiner.*

MILTON L. SMITH, *Examiner.*